United States Patent
Frymoyer

(10) Patent No.: US 6,325,395 B1
(45) Date of Patent: Dec. 4, 2001

(54) WHEELED BUOYANT DECOY TRANSPORTING DEVICE

(76) Inventor: Jeffrey L. Frymoyer, 1316 N. 6$^{th}$ St., Reading, PA (US) 19601

( * ) Notice: Subject to any disclaimer, the term of this patent is extended or adjusted under 35 U.S.C. 154(b) by 0 days.

(21) Appl. No.: 09/500,351

(22) Filed: Feb. 7, 2000

(51) Int. Cl.$^7$ ...................................................... B62B 1/00
(52) U.S. Cl. ................... 280/47.26; 280/652; 280/47.18
(58) Field of Search ............................. 280/652, 47.131, 280/47.18, 47.26; 114/344, 351

(56) References Cited

U.S. PATENT DOCUMENTS

| | | | | |
|---|---|---|---|---|
| 2,881,007 | * | 4/1959 | Karwatt et al. | 280/47.17 |
| 2,986,401 | * | 5/1961 | Altadonna | 280/36 |
| 4,050,708 | * | 9/1977 | Samadzija et al. | 280/47.26 |
| 4,349,210 | * | 9/1982 | Rutt | 280/47.21 |
| 4,738,457 | * | 4/1988 | Conrad | 280/47.26 |
| 4,789,180 | * | 12/1988 | Bell | 280/652 |
| 4,824,137 | * | 4/1989 | Bolden | 280/652 |
| 5,163,694 | * | 11/1992 | Reichek | 280/47.26 |
| 5,313,817 | | 5/1994 | Meinders | 62/457.1 |
| 5,318,315 | * | 6/1994 | White et al. | 280/47.26 |
| 5,330,212 | * | 7/1994 | Gardner | 280/40 |
| 5,492,346 | | 2/1996 | Stadler et al. | 280/47.19 |
| 5,611,561 | | 3/1997 | Dale, II | 280/652 |
| 5,660,296 | | 8/1997 | Greenwich | 220/326 |
| 5,660,403 | | 8/1997 | O'Neill et al. | 280/47.19 |
| 6,042,128 | * | 3/2000 | Dinkins | 280/47.18 |
| 6,109,644 | * | 8/2000 | Cox | 280/652 |
| 6,139,029 | * | 10/2000 | Shaw | 280/8 |
| 6,164,671 | * | 12/2000 | Darling, III | 280/30 |

* cited by examiner

*Primary Examiner*—Daniel G. DePumpo
*Assistant Examiner*—James S. McClellan
(74) *Attorney, Agent, or Firm*—Henderson & Sturm LLP

(57) ABSTRACT

A waterfowl decoy transporting device 10 for use on solid, semi-liquid and liquid surfaces wherein the device includes a four sided slatted enclosure member 40 which is releasably connected to a generally thick rigid flotation member 30 provided with a removable wheel assembly unit 11 including a pair of tall, thin wheel members 20. The flotation member 30 is operatively associated with a towing bar member 50 for towing the decoy transporting device 10 over a variety of surfaces.

12 Claims, 2 Drawing Sheets

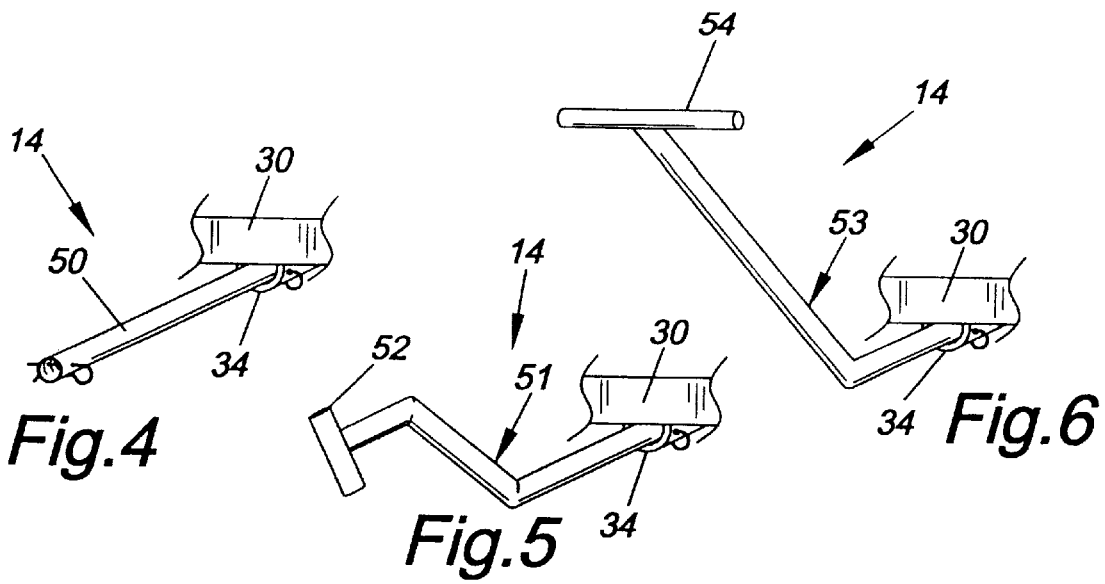
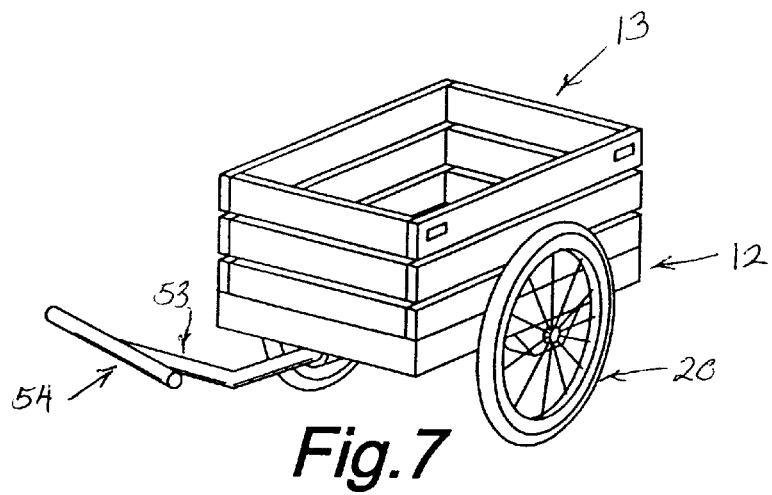
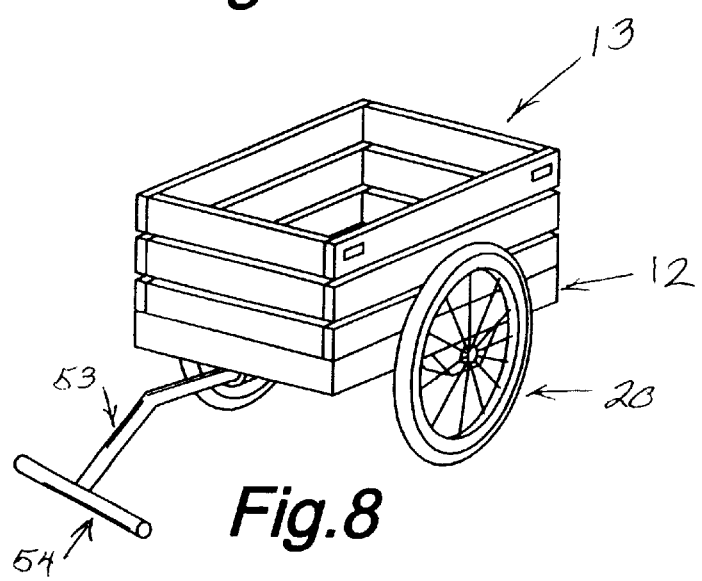

WHEELED BUOYANT DECOY TRANSPORTING DEVICE

BACKGROUND OF THE INVENTION

1. Field of the Invention

The present invention relates to the field of wheeled transport devices in general, and in particular to a wheeled cart having flotation features that allow decoys to be floated out to a water blind.

2. Description of Related Art

As can be seen by reference to the following U.S. Pat. Nos. 5,313,817; 5,492,346; 5,611,561; 5,660,296; and 5,660,403, the prior art is replete with myriad and diverse wheeled cart constructions for transporting miscellaneous items.

While all of the aforementioned prior art constructions are more than adequate for the basic purpose and function for which they have been specifically designed, they are uniformly deficient with respect to their failure to provide a simple, efficient, and practical device that can be used to transport waterfowl decoys to and from a place of use.

As most waterfowl hunters are all too well aware, the most labor intensive aspect of their pursuit is the hauling of a sufficient number of waterfowl decoys to and from a blind site to potentially insure a successful day of hunting.

Unfortunately, one of the practical realities of waterfowl hunting revolves around the fact that the larger the number of decoys employed, the greater the probability that the birds will come into the decoy set up.

As a consequence of the foregoing situation, there has existed a longstanding need among water fowlers for a new and improved type of waterfowl decoy transporting device that is equally effective in traversing corn stalk stubble, marsh grasses, mud flats, and expanses of water, and the provision of such a construction is a stated objective of the present invention.

BRIEF SUMMARY OF THE INVENTION

Briefly stated, the decoy transporting device that forms the basis of the present invention comprises in general, a wheel assembly unit, a buoyancy unit, a collapsible enclosure unit and a towing bar unit. The wheel assembly unit, the collapsible enclosure unit, and the towing bar unit are all releasably associated with the buoyancy unit.

As will be explained in greater detail further on in the specification, the wheel assembly unit includes a pair of narrow gauge large diameter wheels that elevate the remainder of the transport device at a sufficient height that the bottom of the buoyancy unit will not encounter substantial resistance from vegetation, such as cut corn stalks, and marsh grasses and the slim wheel profile will also facilitate the transport of the device over most mud flats with minimal resistance.

In addition, since the wheel assembly unit is removably attached to the buoyancy unit, the wheel assembly can be quickly detached from the remainder of the device when very shallow bodies of water must be traversed to get to a blind site.

As will also be explained in greater detail further on in the specification, both the buoyancy unit and the collapsible enclosure unit are provided with self-draining features so that water will flow freely through the device as it is being towed across a body of water to substantially eliminate fluid drag on the device. The handle unit comes in a variety of configurations to accommodate both manual and mechanized transport of the device.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is an isolated detail view of one version of the towing bar unit;

FIG. 5 is an isolated perspective view of another version of the towing bar unit;

FIG. 6 is an isolated perspective view of yet another version of the towing bar unit;

FIG. 7 shows the towing bar in a towing configuration; and

FIG. 8 shows the towing bar in a support configuration.

DETAILED DESCRIPTION OF THE INVENTION

Figure 1:
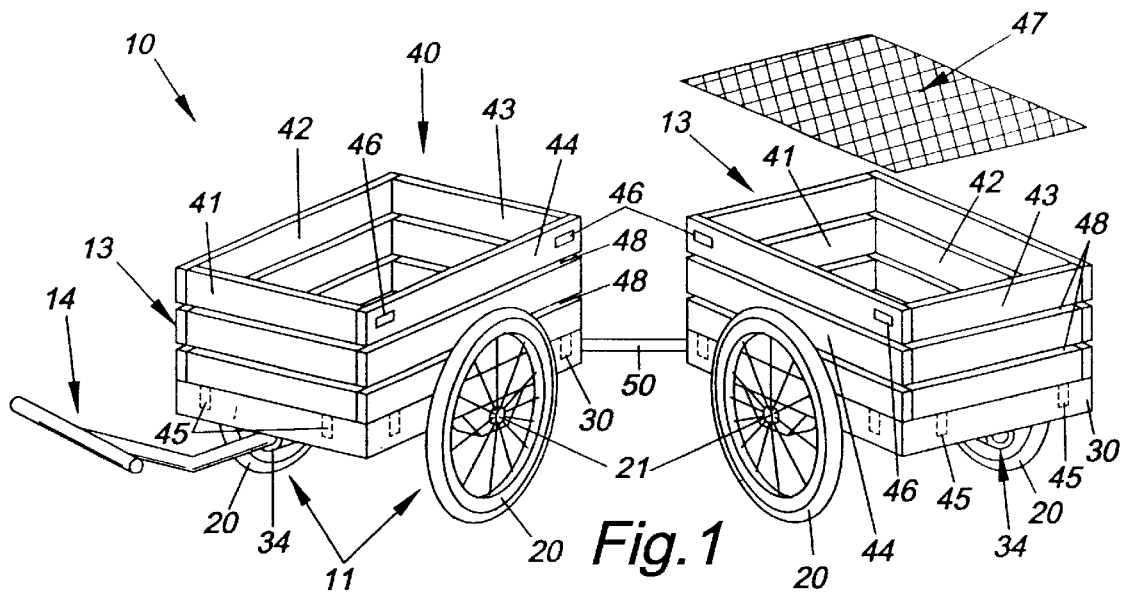
FIG. 1 is a perspective view of two of the decoy transport devices linked together in a train fashion.

As can be seen by reference to the drawings, and in particular to FIG. 1, the decoy transporting device that forms the basis of the present invention is designated generally by the reference number 10. The device 10 comprises in general, a wheel assembly unit 11, a buoyancy unit 12, a collapsible enclosure unit 13, and a towing bar unit 14. These units will now be described in seriatim fashion.

Figure 2:
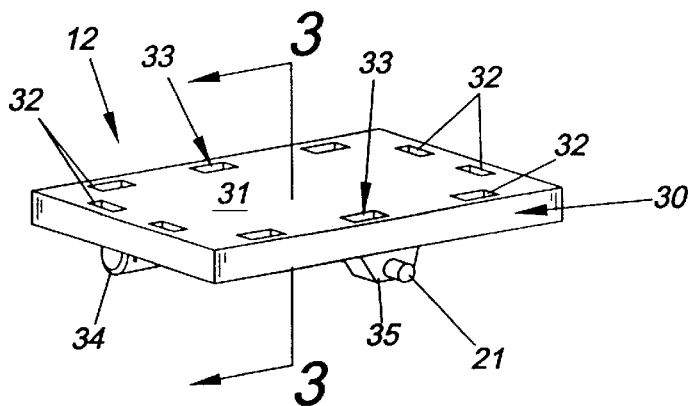
FIG. 2 is an isolated perspective view of the buoyancy unit.

As shown in FIGS. 1 and 2, the wheel assembly unit 11 comprises a pair of narrow width enlarged diameter wheel members 20 which are each mounted on an axle element 21 which may be formed integrally with the respective wheel members 20 or in the alternative formed as part of the buoyancy unit 12 as will be explained in greater detail further on in the specification.

In addition, in the preferred embodiment of the invention, the wheel members 20 will have a minimum outside diameter of fifteen inches and a maximum width of two inches wherein the ideal diameter will be twenty inches and the ideal width will be approximately one and one quarter inch so that the wheel members will have a very slim profile to reduce drag created by the passage of the wheel members 20 through vegetation and over soft soil as would be encountered on mud flats or the like.

Figure 3:
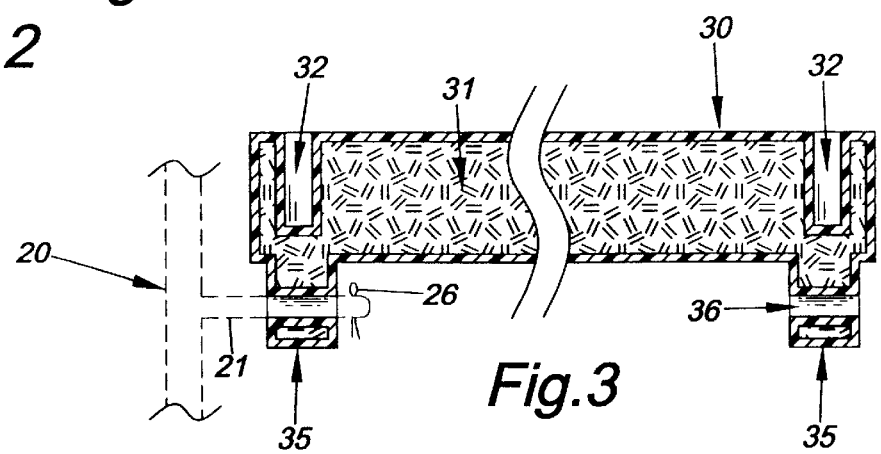
FIG. 3 is a cross section view taken through line 3—3 of FIG. 2.

Turning now to FIGS. 2 and 3, it can be seen that the buoyancy unit 12 comprises a generally thick and rigid rectangular flotation member 30 fabricated from buoyant material 31 such as closed cell foam or the like. The upper surface of the flotation member 30 is provided with a plurality of stake receiving recesses 32 and one or more drainage apertures 33.

In addition, as shown in FIGS. 1 and 2, both the front and rear portions of the flotation member 30 are provided with generally U-shaped tow bar clamps 34 which are adapted to be engaged by a variety of towing handle units 14 as will be explained in greater detail further on in the specification.

As can be seen by reference to FIGS. 2 and 3, in both versions of the preferred embodiment of the buoyancy unit 12, the opposite sides of the flotation member 30 are provided with downwardly depending axle support segments 35. In one version of the preferred embodiment, the axle element 21 is formed integrally with and projects outwardly from each of the axle support segments 35. In the other version of the preferred embodiment, each axle support segment 35 is provided with a lateral aperture 36 dimensioned to receive the axle element 21 which is captively engaged relative to the axle support segment by a conventional locking pin 26 or the like.

Returning once more to FIG. 1, it can be seen that the collapsible enclosure unit 13 comprises a slatted enclosure member 40 which includes four slatted panels 41, 42, 43, 44 wherein the bottom portion of each of the panels is provided with a pair of pegs 45 which are dimensioned to be received in the recesses 32 formed in the top surface in the flotation member 30.

In addition, when not in use, each of the four slatted panels 41, 42, 43, 44 can be removed form the flotation member 30 and stacked thereon with the removable wheel members 20 resting on top of the slatted panels 41, 42, 43, 44 to produce a very compact storage profile.

Furthermore, the upper portion of at least some of the slatted panels 42, 44 are provided with fastening elements 46 which are adapted to releasably engage a camouflage netting element 47 which will cover the top of the enclosure member 40 to retain decoys within the enclosure member 40. The openings 48 between the slats allows water to flow through the enclosure member 40 to reduce fluid drag when the device 10 is being towed across roiled bodies of water.

Turning now to FIGS. 4 through 6, it can be seen that the towing bar unit 14 comes in a variety of different configurations which include a straight towing bar member 50 which is used to trail one transport device 10 behind another transport device 10; a generally S-shaped towing bar member 51 having a vertical hitch post 52 for towing the transport device 10 with an ATV; and a generally L-shaped manual towing bar member 53 having a generally T-shaped handle element 54 formed on the outboard end thereof.

In addition, as can be seen by reference to FIGS. 7 and 8, the generally L-shaped manual towing bar member 53 and T-shaped handle element 54 can be disposed in the towing configuration depicted in FIG. 7 or rotated 180° as shown in FIG. 8 to form a three point support configuration for the combined buoyancy unit 12 and collapsible enclosure unit 13.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A waterfowl decoy transporting device comprising:

a buoyancy unit including a generally thick rigid buoyancy member; having at least one drain aperture; and a plurality of recesses formed proximate the outer edges of the buoyancy member; and, a pair of tow bar connectors disposed on the front and rear of the bottom of the buoyancy member;

an enclosure unit projecting upwardly from the buoyancy unit and including a four sided enclosure member operatively associated with said plurality of recesses;

a wheel assembly unit connected to said buoyancy unit and including two relatively tall thin wheel members provided with axle elements removably associated with the opposite sides of the buoyancy member; and a towing bar unit including a towing bar member for towing the transport device over solid and liquid surfaces.

2. The device as in claim 1 wherein the device is further provided with means for allowing water to flow through the device.

3. The device as in claim 2 wherein the means for allowing water to flow through the device comprises a plurality of openings formed in the sides of the enclosure member.

4. The device as in claim 1 wherein the enclosure unit further includes a netting element that extends over the top of the enclosure member.

5. The device as in claim 1 wherein the towing bar unit includes a generally straight towing bar member.

6. The device as in claim 1 wherein the towing bar unit includes a generally S-shaped towing bar member having a free end provided with a hitch post.

7. The device as in claim 1 wherein the towing bar unit includes a generally L-shaped towing bar member having a free end provided with a generally T-shaped handle element.

8. The device as in claim 1 wherein each of the wheel members have a minimum diameter of fifteen inches.

9. The device as in claim 8 wherein each of the wheel members have a maximum width of two inches.

10. The device as in claim 1 wherein the enclosure unit includes four slatted panels that are releasably attached to the flotation member.

11. The device as in claim 10 wherein the four slatted panels are independently connected to the flotation member.

12. The device as in claim 1 wherein the towing bar is adjustable from a towing configuration to a support configuration.

* * * * *